Dec. 17, 1963  J. D. ALLEN  3,114,242
POWER STEERING DEVICE WITH SYMMETRICAL VALVING
Filed Sept. 5, 1961  2 Sheets-Sheet 1
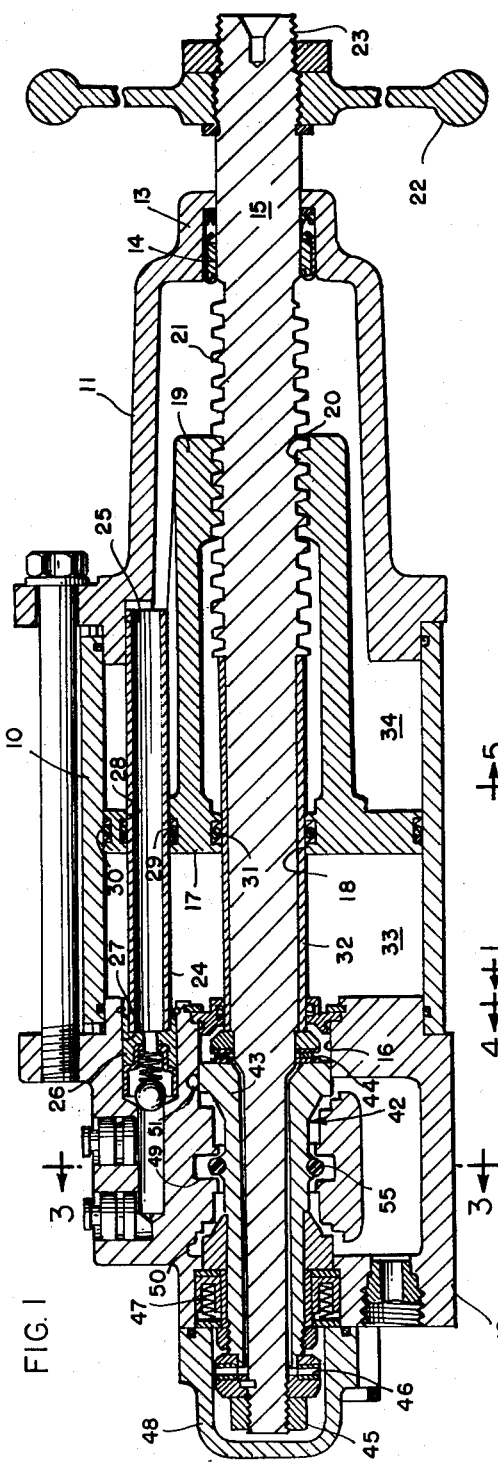
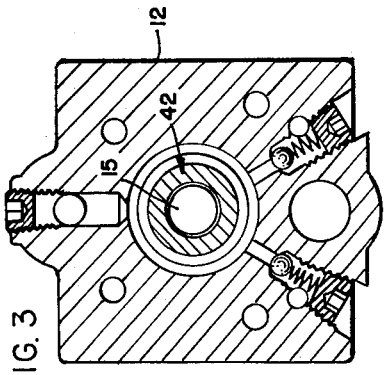
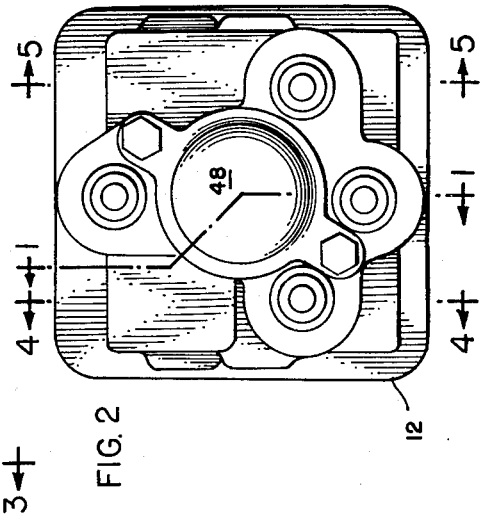
INVENTOR:
JOHN D. ALLEN
BY
Charles P. Vrytech
ATT'Y Dec. 17, 1963 J. D. ALLEN 3,114,242
POWER STEERING DEVICE WITH SYMMETRICAL VALVING
Filed Sept. 5, 1961 2 Sheets-Sheet 2

INVENTOR:
JOHN D. ALLEN
BY
Charles P. Vajtech
ATT'Y

United States Patent Office 3,114,242
Patented Dec. 17, 1963

3,114,242
POWER STEERING DEVICE WITH SYMMETRICAL VALVING
John D. Allen, South Euclid, Ohio, assignor to Fawick Corporation, Cleveland, Ohio, a corporation of Michigan
Filed Sept. 5, 1961, Ser. No. 135,812
6 Claims. (Cl. 60—54.5)

This invention relates to a remote control for a double acting cylinder and will be described with reference to its application to a power steering system for farm tractors or the like.

In United States Patent No. 3,002,501 for Remote Control Hydraulic System With Emergency Manual Control there is described and claimed a preferred embodiment of a double cylinder remote control for power steering using two separate hydraulic systems. The present application is directed to certain valving arrangements which are applicable to an improved single cylinder design.

The principal object of this invention is a valving arrangement for a remote control cylinder for a double acting work or slave cylinder which is substantially identical for both sides of the remote control cylinder whereby to make the operation of the control identical for both directions of movement of the piston in the control cylinder.

For in-phase operation, it is desirable that the fluid in the master and slave cylinders on the active or pressure side of the slave cylinder be captive, and that the fluid in the opposite side of the master cylinder be supplied from a source of fluid under pressure. Since both the master and slave cylinders are double acting, it is necessary that each side of each cylinder be capable of alternately becoming captive and power operated, and it is accordingly another object of this invention to provide a valving arrangement for a double acting master cylinder connected to a double acting slave cylinder wherein either side of each can be made captive while the other side of the master cylinder is operated by fluid under pressure from a separate source.

As a more specific object, this invention seeks to provide a compact combination of valves and master cylinder, wherein the valves are readily accessible for adjustment or replacement.

These and other objects of this invention will become apparent from the following detailed description of a preferred embodiment thereof when taken together with the accompanying drawings in which:

FIG. 1 is a section through a control cylinder of a remote control for a steering system and of certain of the associated valves, the location of the section being indicated in FIG. 2;

FIG. 2 is an end elevation of the control cylinder of FIG. 1;

FIG. 3 is a transverse section through the valve portion of the control cylinder, taken along line 3—3 of FIG. 1 and looking in the direction of the arrows at the ends of said line;

Figure 4:
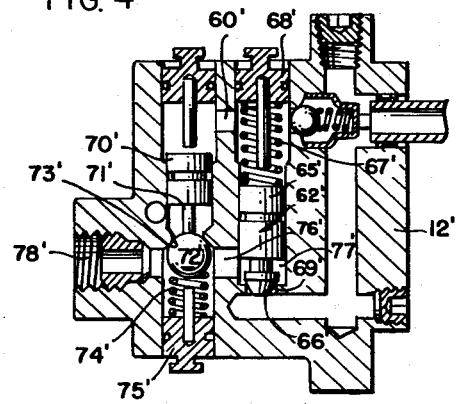
FIG. 4 is a longitudinal section through the valve portion of the control cylinder taken along line 4—4 of FIG. 2 and looking in the direction of the arrows at the ends of said line.

Referring now to the drawings for a detailed description of the invention, and particularly to FIG. 1, the main control cylinder is shown at 10, one end of which is closed by a belled casting 11, and the other end of which is closed by a casting 12 which also serves as a housing for the valves used in the control. Casting 11 has formed in its end remote from the cylinder 10 a bearing support 13 in which is retained an anti-friction bearing 14 forming a support for a steering wheel shaft 15. Said shaft 15 passes through cylinder 10 and into casting 12, the latter being formed with an appropriate opening 16 to receive shaft 15.

Within cylinder 10 is disposed a piston 17 which has a central opening 18 through which shaft 15 passes. Piston 17 is similarly belled and at its remote end 19 has an opening therethrough aligned with opening 18, said remote end opening having internal threads 20 which engage cooperating external threads 21 formed in shaft 15. A steering wheel 22 is secured to the free end 23 of shaft 15 so that shaft 15 is rotated by steering wheel 22. Piston 17 is prevented from turning in cylinder 10 by a tube 24 passing through the piston, one end of the tube being received in a notch 25 formed in casting 11, and the other end of the tube being held in a valve fitting 26 disposed in an opening 27 in casting 12 aligned axially with notch 25. Said tube passes through an opening 28 in piston 17 and is sealed with respect to said piston by a conventional O ring seal 29.

It may be observed that since piston 17 cannot turn with respect to cylinder 10, rotation of steering wheel 22 results in axial movement of piston 17 in said cylinder. With piston 17 sealed at 30 at its outer periphery with respect to cylinder 10 and at 31 in opening 18 on a sleeve 32 on shaft 15, two separate chambers 33, 34 are formed which may be connected by hydraulic circuits hereinafter to be described with corresponding chambers 35, 36 (FIG. 6) of a slave cylinder 37 in which is disposed a slave piston 38. The vehicle wheels 39 to be steered are connected to slave piston 38 through a pinion 40 and a cooperating rack 41 on slave piston 38 so that as piston 38 oscillating in its cylinder 37 under the influence of the differential pressures in chambers 35 and 36, said wheels will be turned by the interaction between rack 41 and pinion 40. The interconnecting hydraulic circuits are so related that when steering wheel 22 is turned clockwise or to the right, as viewed from the operator's station, steered wheels 39 will likewise be turned clockwise or to the right, and when steering wheel 22 is turned to the left, steered wheels 39 will likewise be turned to the left.

The left end of shaft 15, as viewed in FIG. 1, is connected to an open center type power steering valve 42 which may be of the type shown in Patent No. 2,879,748, granted March 31, 1959, said valve comprising a sleeve 43 in which shaft 15 is freely rotatable and which abuts on one end against an end thrust bearing 44 on shaft 15, which in turn bears axially against a sleeve 32 on shaft 15. Said sleeve 32 abuts against the end of threads 21 and is sealed with respect to shaft 15 and casting 12. A nut 45 threaded over the end of shaft 15 forces a second thrust bearing 46 against valve sleeve 43 and provides the axial pressure for maintaining sleeve 43 axially united with shaft 15, although said shaft is freely rotatable in sleeve 43 because of the thrust bearings 44 and 46. The axial position of shaft 15 and its valve sleeve 43 relative to casting 12 is normally determined by a series of centering springs 47 which bear at both ends against washers abutting on casting 12 and on sleeve 43. An end cap 48 covers the free end of shaft 15.

Figure 6:
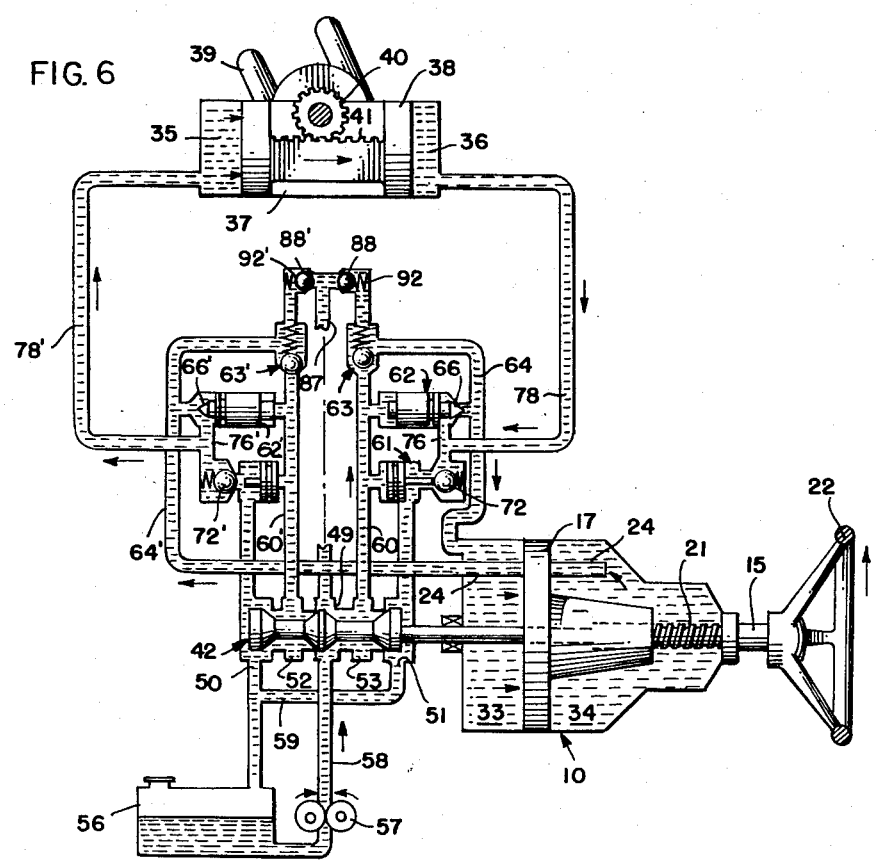
FIG. 6 is a schematic diagram of the hydraulic system used with the control cylinder.

Valve 42 includes an inlet port 49 and two exhaust or vent ports 50 and 51. Two outlet ports 52, 53 are located between the inlet and exhaust ports (FIG. 6). When shaft 15 is under no external axial pressure and hence is axially located by centering springs 47, valve sleeve 43 is symmetrically disposed relative to the ports so that fluid flows from inlet port 49 in both axial directions around an O ring valving member 55 to the vent ports 50 and 51. When shaft 15 is moved axially under external pressure, the inlet port is closed to one outlet port and the opposite vent port is closed, thus allowing pressure to build up in the opposite outlet port. Such pressure is utilized to operate the piston 17 as will be hereinafter explained.

Referring now to FIG. 6, fluid for operating the hydraulic system is supplied from a container or sump 56 by a pump 57 connected to inlet port 49 by a passage 58, and vent ports 50 and 51 are connected to sump 56 by a common passage 59.

The hydraulic circuits connecting the control or master piston 17 with the slave piston 38 are symmetrical with respect to the inlet port so that the same valves are used on each side of piston 17, and both circuits are identical. The circuits are such that when power is applied to one side of piston 17, the fluid on the opposite side is trapped between piston 17 and piston 38, and forces the latter to move with the master piston 17.

Figure 5:
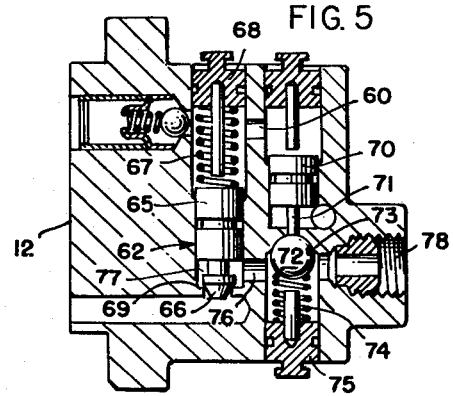
FIG. 5 is another longitudinal section through the valve portion of the control cylinder taken along line 5—5 of FIG. 2 and looking in the opposite direction as indicated by the arrows.

Referring to the diagram of FIG. 6, outlet port 53 is connected by a passage 60 to a pressure responsive valve 61, a pressure differential-operated valve 62 and to a check valve 63. When check valve 63 is open, fluid may flow from passage 60, through check valve 63 to a passage 64 connected directly to chamber 33 in cylinder 10. It may be noted (FIG. 5) that valve 62 has a plunger 65 exposed on one side to pump pressure in passage 60, and that the valve 66 itself is also exposed to pump pressure. However, a spring 67, compressed between plunger 65 and an abutment 68 on casting 12, normally urges plunger 65 and valve 66 toward its valve seat 69 to provide an initial closing of valve 66. The diameter of valve seat 69 is less than the diameter of plunger 65 and hence, although the same unit pressure is exerted in opposite directions on plunger 65 and valve 62, the larger area of the plunger will result in an excess of total pressure on the plunger over that on the valve and hence the valve will remain closed under these conditions.

Pressure responsive valve 61 is comprised of a piston 70 (FIG. 5) to which is secured a pin 71 adapted to contact and unseat a ball check valve 72 which is normally held against its seat 73 by a spring 74 compressed between said ball check valve and an abutment 75 on casting 12. Ball check valve 72 is connected by a passage 76 to plunger chamber 77 on the side of plunger 65 opposite that of spring 67 so that fluid pressure tending to close check valve 72 tends at the same time to open valve 66. Said check valve is normally exposed on its spring side to the pressure in passage 78 connected to chamber 36 in slave cylinder 37.

As stated above, identical valves are employed on the opposite side of power steering valve 42, and to avoid repetition, corresponding valves and their associated plungers, pins, springs and connecting passages have been given the same reference characters, but with the prime added. These identical valves are shown in FIG. 4, and function exactly as their counterparts on the opposite side of valve 42 as described below.

The operation of the device as thus far described is as follows:

Assuming that steered wheels 39 are to be turned to the left (FIG. 6), steering wheel 22 is turned in the usual manner in a counterclockwise direction as viewed from the right in FIG. 6, and because of the resistance to axial movement interposed by piston 17, shaft 15 will move along the threads 20 to the left as viewed in FIG. 6 and will likewise shift power steering valve 42 to the left. This causes valve 42 to close the vent opening 51 and shuts off outlet port 52 to the pump pressure, thus allowing pressure to build up in passage 60. This pressure causes the opening of check valve 72, the closing of plunger operated valve 62, and the opening of check valve 63, thus admitting fluid under pressure to passage 64 and into chamber 33. Said pressure in chamber 33 forces piston 17 to the right as viewed in FIG. 6 and forces the fluid in chamber 34 through tube 24 into passage 64' to close check valve 63', open valve 66' and close check valve 72'. The fluid from passage 64' is then forced through passage 76' into passage 78' leading to chamber 35 to push slave piston 37 to the right as viewed in FIG. 6. Such movement of the slave piston 37 causes, through rack 41 and pinion 40, a rotation of wheels 39 to the left or in the same counterclockwise direction as steering wheel 22.

Meanwhile, pressure in passage 60 causes valve 66 to close and check valve 72 to open, thus permitting fluid from slave chamber 36 to move out through passage 78, exhaust port 51 and vent passage 59 to the sump 56. This allows the slave piston 38 to move as directed by the pressure in the opposite chamber 35. When steering wheel 22 is released, or its turning is stopped by the operator, reaction forces in an axial direction on shaft 15 and valve 42 become substantially zero so that centering springs 47 then become effective to move valve 42 to its center position wherein the output of the pump 57 is returned through exhaust ports 50 and 51 to sump 56 without building up pressure in either passage 60 or its counterpart 60'. With pressure removed, slave piston 38 will remain where it is, thus halting the rotation of steered wheels 39 and holding them in their last position.

Thus both sides of master piston 17, i.e., chambers 33 and 34, are actuated by the output of pump 57 instead of being actuated by a captive quantity of fluid, and although the valving is such as to at times make one side or the other captive, this captive state becomes a pump operated state when the direction of the steering wheel is changed. This means that at each cycle the master cylinder chambers, as well as the slave cylinder chambers, are filled with fresh fluid.

In the event that power should fail so that no pump pressure is available, then, assuming that a left turn is being made, check valve 63 will close, as will also check valve 72. The manually exerted force on wheel 22 will cause piston 17 to move to the right on the thread 21 and force fluid from master cylinder chamber 34 through tube 24 and into 35 through the intermediate passages described above. The fluid from slave chamber 36 will be forced out into passages 78 and 76. Since check valve 72 is closed, the fluid will act against the valve side of plunger 65 in valve 62 to push valve 66 off its seat and allow the fluid to enter passage 64, whence it will enter master cylinder chamber 33. It may be noted that the fluid does not enter into the vent passages and return to the sump as would be the case when the pump is operating.

Should pump 57 fail, therefore, both sides of the master cylinder become captive and the transition from the power "on" condition to the power "off" condition is sufficiently rapid to avoid a loss of fluid such as would throw the steering wheel out of phase with the steered wheels.

Replacement of fluid lost through leakage is effected by ball check valves 88 and 88'. Said valves are normally held closed by springs 92 and 92' respectively. It may be observed that the balls 88 and 88' of the valves are exposed at all times to pump pressure through passage 87 connected to the outlet passage 58 from pump 57. The opposite sides of the balls 88 and 88' are exposed to the pressures in master cylinder chambers 33 and 34, respectively, plus the pressures of their respective springs 92 and 92'.

Under normal operating conditions, movement of piston 17 in master cylinder 10 does not create a large pressure differential in chambers 33 and 34, although the pressure in the chamber then connected to the pump will be greater than that in the opposite chamber. Such pressure differential, however, is not great enough to overcome springs 92 or 92'. If there is a leak in the system, piston 17 in the master cylinder will reach the end of its travel before slave piston 38 does, and at this point, pressure in the driven side will drop greatly, thus making it possible for the pump pressure to exceed the pressure of springs 92 or 92' as the case may be, and open the valve. Fluid under pump pressure will then flow into the system and will continue to flow and push slave piston 38 until it, too, reaches the end of its travel, whereupon the pressure in the system will rapidly increase until a balance is achieved and the valve will close. The two pistons, master and slave, are thus again synchronized.

It is understood that the foregoing description is merely illustrative of a preferred embodiment of this invention and that the scope of the invention therefore is not to be limited thereto, but is to be determined by the appended claims.

I claim:

1. A remote control for a power driven device comprising a master cylinder remote from said device, a master piston in said master cylinder, a slave cylinder having a slave piston therein connected to drive said device, a source of fluid under pressure, a sump for fluid from said source, manually operable means for moving said master piston axially in said master cylinder, open center valve means connected to the manually operable means and adapted to be shifted in response to a predetermined axial pressure impressed thereon by the manually operable means, first passages conducting fluid from the master cylinder at one side of the master piston to the slave cylinder at one side of the slave piston, second passages conducting fluid from the master cylinder at the other side of the master piston to the slave cylinder at the other side of the slave piston, means for selectively trapping the fluid between either side of the master piston and the corresponding side of the slave piston, and means for connecting the opposite side of the master piston to the source of fluid under pressure.

2. A remote control for a power driven device comprising a master cylinder remote from said device, a master piston in said master cylinder, a slave cylinder having a slave piston therein connected to drive said device, a source of fluid under pressure, a sump for fluid from said source, manually operable means for moving said master piston axially in said master cylinder, open center valve means connected to the manually operable means and adapted to be shifted in response to a predetermined axial pressure impressed thereon by the manually operable means, first passages conducting fluid from the master cylinder at one side of the master piston to the slave cylinder at one side of the slave piston, second passages conducting fluid from the master cylinder at the other side of the master piston to the slave cylinder at the other side of the slave piston, means for slectively trapping the fluid between either side of the master piston and the corresponding side of the slave piston, and means for connecting the opposite side of the slave piston to the sump.

3. A remote control for a power driven device comprising a master cylinder remote from said device, a master piston in said master cylinder, a slave cylinder having a slave piston therein connected to drive said device, a source of fluid under pressure, a sump for fluid from said source, manually operable means for moving said master piston axially in said master cylinder, open center valve means connected to the manually operable means and adapted to be shifted in response to a predetermined axial pressure impressed thereon by the manually operable means, first passages conducting fluid from the master cylinder at one side of the master piston to the slave cylinder at one side of the slave piston, second passages conducting fluid from the master cylinder at the other side of the master piston to the slave cylinder at the other side of the slave piston, means for selectively trapping the fluid between either side of the master piston and the corresponding side of the slave piston, means for connecting the opposite side of the master piston to the source of fluid under pressure, and means for connecting the opposite side of the slave piston to the sump.

4. A remote control for a power driven device comprising a master cylinder remote from said device, a master piston in said master cylinder, a slave cylinder having a slave piston therein connected to drive said device, a source of fluid under pressure, a sump for fluid from said source, manually operable means for moving said master piston axially in the said master cylinder, open center valve means connected to the manually operable means and adapted to be shifted in response to a predetermined axial pressure impressed thereon by the manually operable means, a first passage adapted to be connected through the open center valve means to the source of fluid under pressure, a second passage adapted to be connected through the open center valve means to the sump, a third passage connected to the chamber in the master cylinder on one side of the master piston, a fourth passage connected to the chamber in the slave cylinder on one side of the slave piston, a normally closed valve connecting the second and fourth passages and adapted when open to vent the fluid in the said slave cylinder chamber, a normally closed valve connecting the first and third passages to admit fluid under pressure to said master cylinder chamber, a pressure differential operated valve adapted to connect the third passage to the fourth passage to admit fluid from the said master cylinder chamber to said fourth passage, said pressure differential operated valve being exposed on one side to the fluid in the third passage and on its other side to the fluid in the first passage, and pressure differential operated means responsive to the difference in pressure in the first and second passages for opening the normally closed valve connecting the second and fourth passages.

5. A remote control as described in claim 4, and including further a fifth passage adapted to be connected through the open center valve means to the source of fluid under pressure, a sixth passage adapted to be connected through the open center valve means to the sump, a seventh passage connected to the chamber in the master cylinder on the other side of the master piston, an eighth passage connected to the chamber in the slave cylinder on the other side of the slave piston, a normally closed valve connecting the sixth and eighth passages and adapted when open to vent the fluid in the said other slave cylinder chamber, a normally closed valve connecting the fifth and seventh passages to admit fluid under pressure to said other master cylinder chamber, a pressure differential operated valve adapted to connect the seventh passage to the eighth passage to admit fluid from the said other master cylinder chamber to said eighth passage, said pressure differential operated valve being exposed on one side to the fluid in the seventh passage and on its other side to the fluid in the fifth passage, and pressure differential operated means responsive to the difference in pressure in the sixth and fifth passages for opening the normally closed valve connecting the sixth and eighth passages.

6. A remote control as described in claim 5, and a check valve, responsive to fluid under pressure from said source to connect said source of fluid under pressure to the seventh passage when the pressure in said seventh passage falls below the pressure of the fluid from said source by a predetermined amount, whereby to bring the power driven device into phase with the manually operable means.

References Cited in the file of this patent

UNITED STATES PATENTS

| | | |
|---|---|---|
| 2,067,491 | Kingsbury | Jan. 12, 1937 |
| 2,188,698 | Armstrong | Jan. 30, 1940 |
| 2,607,321 | Lado | Aug. 19, 1952 |
| 3,002,501 | Banker | Oct. 3, 1961 |